Sept. 21, 1926.　　　　　　　　　　　　　　　　　1,600,483
M. J. OWENS
MECHANISM FOR TRANSFERRING WARE TO LEERS
Filed May 11, 1923　　　3 Sheets-Sheet 1
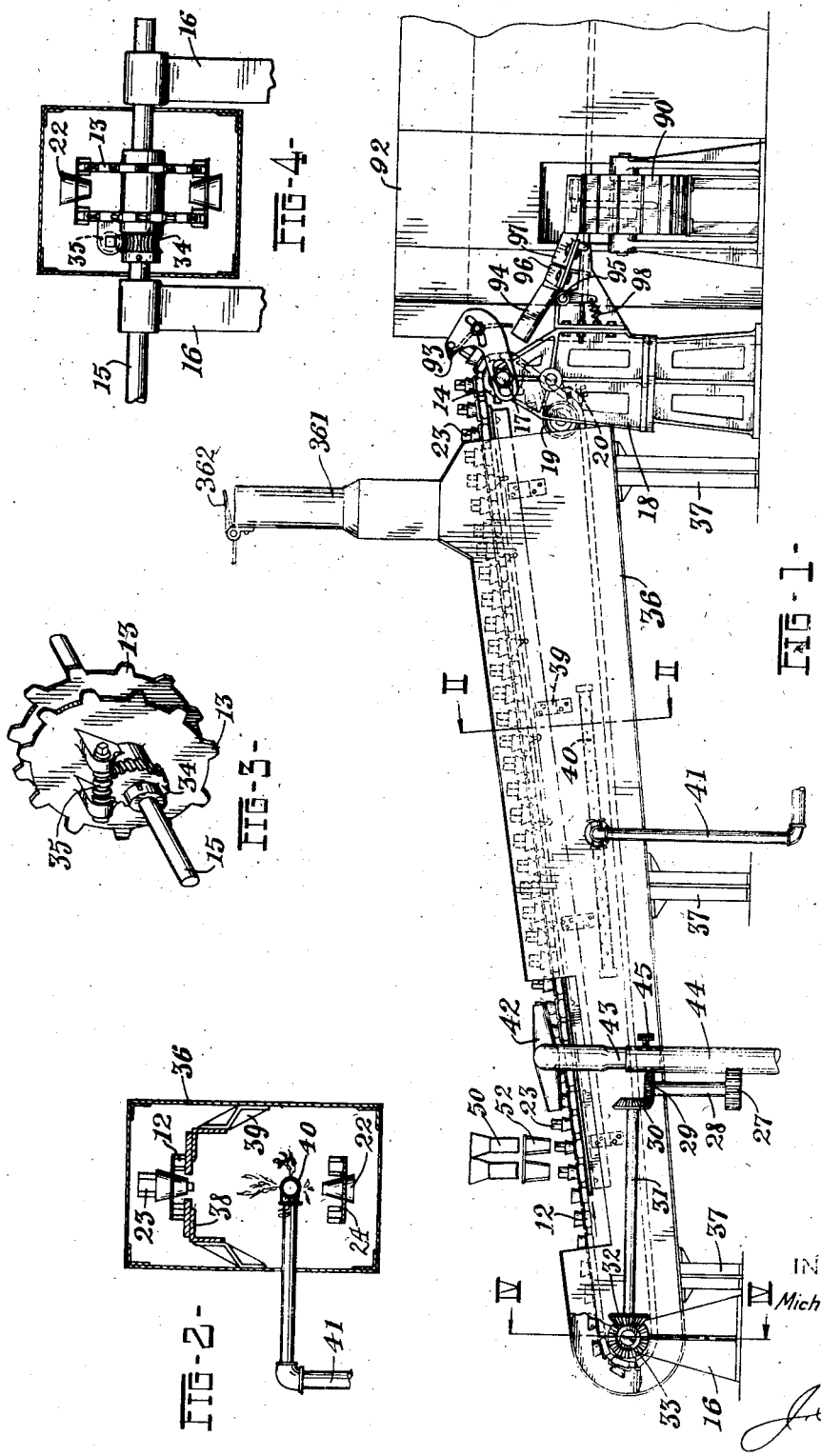
INVENTOR
Michael J. Owens
By
J. F. Rule
His Atty.

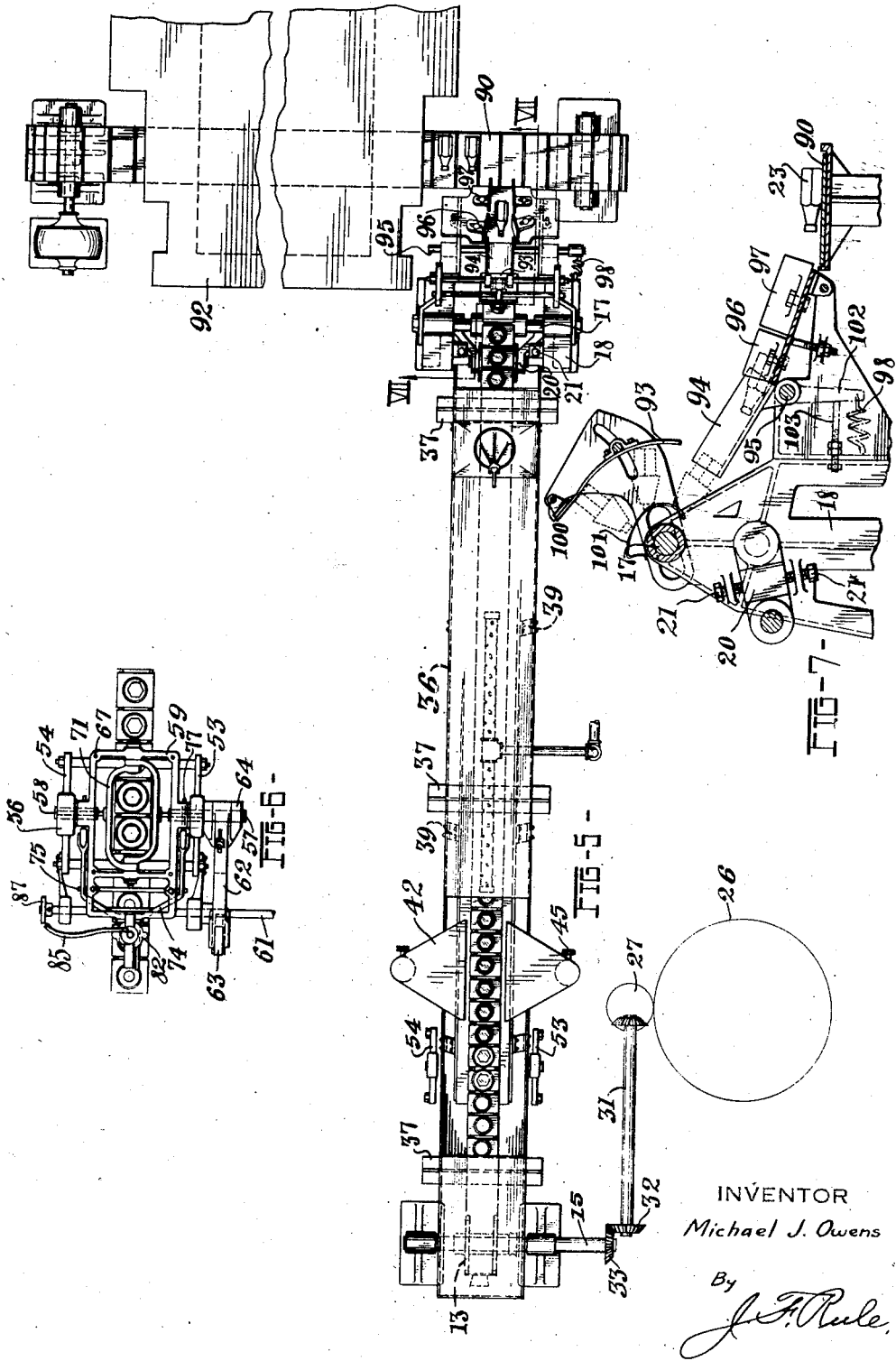

Sept. 21, 1926.                                                                                                   1,600,483
M. J. OWENS
MECHANISM FOR TRANSFERRING WARE TO LEERS
Filed May 11, 1923            3 Sheets-Sheet 3
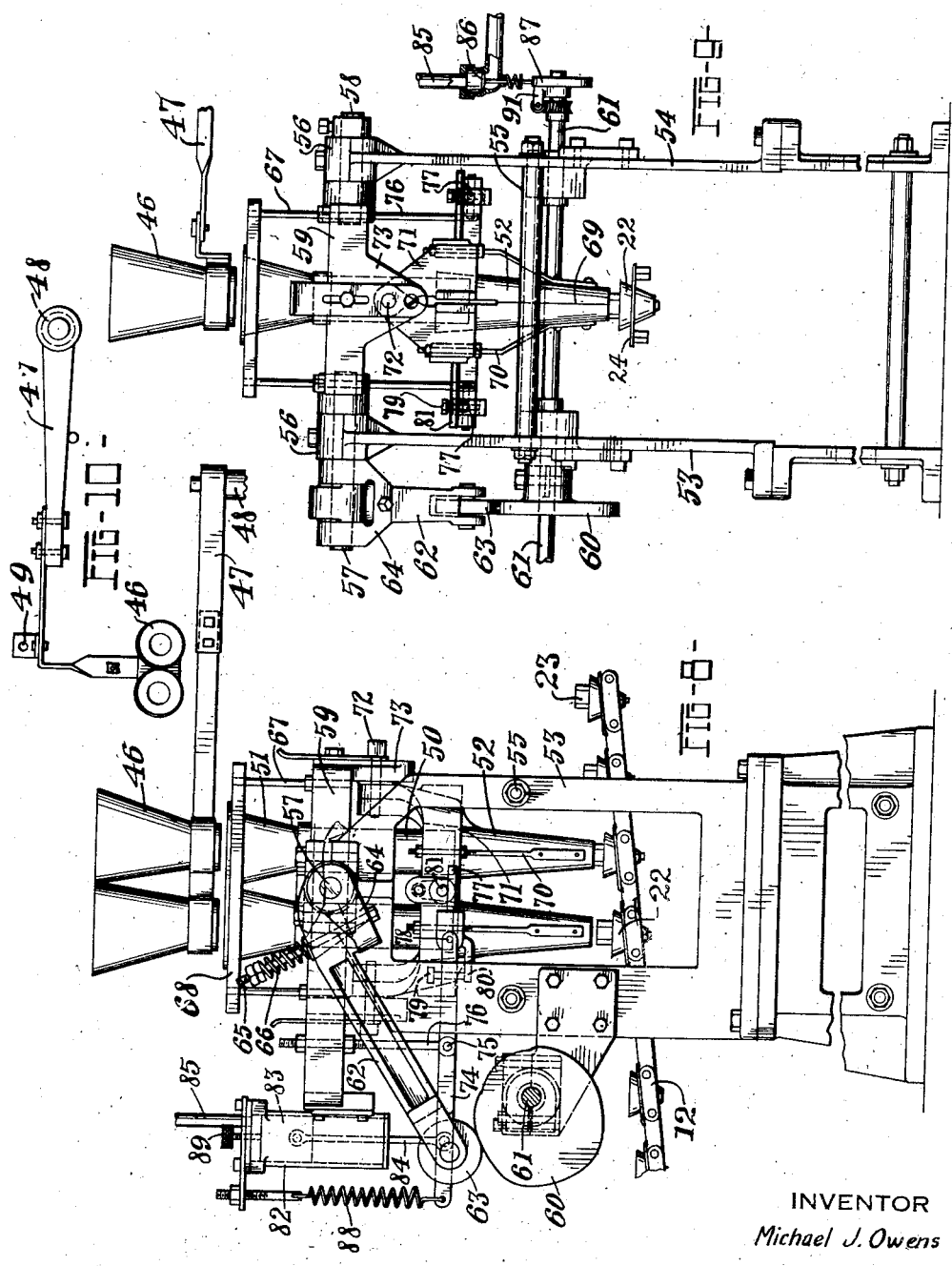
INVENTOR
Michael J. Owens
By J. F. Rule
His Att'y.

Patented Sept. 21, 1926.

1,600,483

UNITED STATES PATENT OFFICE.

MICHAEL J. OWENS, OF TOLEDO, OHIO, ASSIGNOR TO THE OWENS BOTTLE COMPANY, OF TOLEDO, OHIO, A CORPORATION OF OHIO.

MECHANISM FOR TRANSFERRING WARE TO LEERS.

Application filed May 11, 1923. Serial No. 638,261.

My invention relates to mechanism for transferring bottles or other glass articles from a forming machine to an annealing oven or leer. An object of the invention is to provide practical mechanism for receiving the hot ware which is in a soft, plastic condition as it is discharged from the forming machine, and transferring it to the leer without distorting, breaking, marring or unduly cooling it.

Each bottle or other article as it is discharged from the blowing machine, is dropped through a spout, beneath which is a clapper device to break the fall and from which the bottles are delivered neck end downward into cup-like holders on an endless conveyor. The bottles are thereby supported in upright position on the conveyor and carried by the conveyor to a point adjacent the leer and then transferred to an endless belt conveyor which carries them into the leer.

The holding cups on the conveyor are specially adapted for holding a great variety of sizes and shapes of bottles and other ware. It is found in practice that when held in this manner there is practically no collapsing of the sides of the bottles as they tend to do when they rest for any length of time on their sides, as is necessary when the usual means are employed for carrying the bottles to the leer. Holding the bottles vertically in the manner above noted also permits the application of air to cool the bottoms of the bottles which ordinarily cool much more slowly than the neck and body portions, without danger of the air being applied where it will cause the glass to check.

The present invention provides means for handling the glass articles either singly or in pairs or groups where a plurality are delivered from the blowing machine at once. The articles are carried rapidly to the leer entrance, at which point they are placed on a belt which is heated to avoid cold checking, and quickly carried thereby into the leer. The articles throughout their transfer are held out of contact with each other and handled in such a manner that checking, chipping and other injuries are reduced to a minimum.

Other objects of the invention will appear hereinafter.

In the accompanying drawings, which illustrate apparatus constructed in accordance with the principles of my invention:

Figure 1 is an elevation of the apparatus.

Figure 2 is a section at the line II—II on Figure 1.

Figure 3 is a perspective view of means for adjusting the driving sprockets for the conveyor on their drive shaft.

Figure 4 is a section at the line IV—IV on Figure 1.

Figure 5 is a plan view of the apparatus shown in Figure 1.

Figure 6 is a top plan view of the mechanism for delivering the bottles to the cup conveyor.

Figure 7 is a sectional elevation at the line VII—VII on Figure 5.

Figure 8 is a front elevation of the mechanism shown in Figure 6.

Figure 9 is an end elevation of the same.

Figure 10 is a diagrammatic view of funnel guides and means for swinging them out of operative position.

And endless chain conveyor 12 runs over driving rolls or sprockets 13 at one end of the conveying mechanism and driven rolls or sprockets 14 at the other end of said mechanism. The sprockets 13 are mounted on a drive shaft 15 having bearings in standards 16. The sprocket wheels 14 are mounted on a shaft 17 journalled in standards 18. The conveyor is held under tension by an idler pulley 19 mounted on a rock arm 20 (see Fig. 7) held in adjusted position by set screws 21. The conveyor is provided with bottle-holding cups 22 to which the bottles 23 are delivered through spouts 50 (Fig. 1) and clappers 52 as hereinafter described. The cups 22 are attached to the belt sections or plates 24 which connect the parallel conveyor chains, said cups being tapered throughout their length to form frusto conical holders adapted to receive and discharge vari-sized bottles or other ware through the large end.

The conveyor is driven by or in synchronism with the bottle blowing machine from which the bottles are delivered. The bottle blowing machine indicated diagrammatically at 26 (Fig. 5) drives a pinion 27. The motion is transmitted through a shaft 28 (Fig. 1), gears 29 and 30, shaft 31 and gears 32 and 33, the latter secured to the drive shaft 15.

In order to adjust the cup conveyor so that the cups 22 will be in register with the clappers 52, there is provided adjusting mechanism shown in Figures 3 and 4. This comprises a worm wheel 34 keyed to the shaft 15 and meshing with a worm 35 journalled in lugs on one of the sprocket wheels 13. The hub of the sprocket wheels is loose on the drive shaft so that by rotating the worm 35, the sprocket wheels and with them the conveyor may be adjusted.

The cup conveyor for the greater portion of its length is enclosed in a casing 36 mounted on supports 37. The upper lead of the conveyor is supported on angle bars 38 (Fig. 2) extending lengthwise of the conveyor and carried by brackets 39 attached to the side walls of the casing. In order to prevent undue cooling of the bottles in their passage to the leer, there is provided heating means for maintaining a high temperature within the casing 36. The heating means as herein shown comprises a burner 40 consisting of a pipe extending lengthwise within the casing and provided with a multiplicity of perforations from which the burning gas issues, said gas being supplied through a pipe 41. The casing is equipped with a smoke pipe 361 and damper 362.

As the bottoms of the bottles usually cool more slowly than the other portions, owing to the greater thickness of the glass at this point, there is provided cooling means for applying a blast of air directly against the bottoms of the bottles. Such means comprises blowers 42 carried by adjustable pipe sections 43 telescoping with stationary pipes 44 through which cooling air under pressure is supplied. The blowers 42 are adjustable vertically to adapt them to bottles of different lengths and are held in adjusted position by set screws 45.

The mechanism for directing the bottles from the blowing machine to the cup conveyor will now be described. This mechanism, shown particularly in Figures 6, 8, 9 and 10, comprises funnel guides 46 into which the bottles are dropped neck end first from the blow molds, the spouts 50, clappers 52 and their actuating mechanism. I have shown a pair of guides 46 for receiving bottles from a double mold, but it will be understood that a greater or less number of such guides may be used, depending on the number of bottles simultaneously discharged from the molds. The guides 46 are carried on an arm 47 mounted to swing horizontally on a post 48, so that the guides may quickly be swung to one side by the operator to prevent defective ware from being placed on the conveyor or for other purpose. The arm 47 may be actuated by a tool engaging an opening 49.

The bottles drop through the guides 46 into and through the vertical spouts 50, the upper ends 51 of which are also preferably flared upwardly and outwardly, as shown. The lower ends of the spouts 50 project into retarding devices 52, each of which comprises a pair of downwardly and inwardly tapered hollow members or clappers which together form a funnel-shaped holder. These clappers momentarily arrest the bottles in their descent and serve to break the force of their fall, after which the clappers are opened as hereinafter described to release the bottles and drop them into the conveyor cups.

The mechanism for directing and controlling the bottles during their passage from the guides 46 to the conveyor cups, is mounted on a stationary frame-work comprising vertical frame members 53 and 54 on opposite sides of the conveyor. These frame members are connected by tie-rods 55. Journalled in bearings 56 in the upper ends of the stationary frame, are rock shafts 57 and 58 which carry a horizontally disposed, rectangular rocking frame 59 (Figs. 6, 8, 9) on which are supported the spouts 50 and clappers 52. The frame 59 is rocked for the purpose of causing the clappers to advance with the traveling cup conveyor to maintain the clappers in register with or in proper relation to the cups while discharging the bottles, the frame being then swung back so that the clappers may advance with the next succeeding cups.

The frame 59 is rocked by a cam 60 keyed to a continuously rotating drive shaft 61. The cam actuates a rock arm 62 having a roll 63 running on the cam. The rock arm is loosely mounted on the shaft 57 and drives the latter through an arm 64 keyed to said shaft and having a yieldable connection with the arm 62 through a rod 65 and spring 66. This connection serves as a safety device to permit the rock arm 62 to swing without movement of the frame 59 in case of any obstruction in the path of the swinging frame or parts carried thereby.

Secured to and projecting upward from the frame 59 are rods 67 carrying at their upper ends a plate 68 in which the spouts 50 are supported. Each of the clappers 52 comprises separable sections having edges 69 (Fig. 9) which meet in a vertical plane extending lengthwise of the cup conveyor. The clapper sections are adjustably connected by rods 70 to supporting members 71. The latter, as indicated in Figures 6 and 8, have their ends curved inwardly and upwardly and are mounted to swing on pivots 72 carried in depending lugs 73 on the ends of the frame 59.

The mechanism for opening and closing the clappers is as follows: An actuating member 74, in the form of a yoke, is mounted to rock on a horizontal pivot rod 75 supported in rods 76 depending from and adjustable vertically in the frame 59. At the forward end of each yoke arm is a finger 77 connected by a pivot 78 to the yoke arm and adjustable relative to the arm by a set screw 79 mounted in the yoke arm and engaging an extension 80 of the finger 77. The fingers 77 engage beneath rods 81 projecting from the clapper supports 71. It will be seen that with this construction, when the yoke 74 is rocked about its pivot 75 to move the fingers 77 upward, the latter will lift the rods 81, thereby swinging the clapper sections apart about their pivot 72. This releases the bottles which have momentarily been arrested in the clappers and permits the bottles to drop neck end first into the conveyor cups 22.

An air motor is provided for actuating the clappers, comprising a cylinder 82 and piston 83, the latter connected through a rod 84 to the yoke 74. Air under pressure for actuating the motor is supplied through a pipe 85. The air supply is controlled by a valve 86 (Fig. 9) actuated by a cam 87 on the shaft 61. An adjusting device 91 permits rotative adjustment of the cam for timing the operation of clappers. This adjusting device may be of the same construction as that shown in Figure 3. When air is supplied through the pipe 85, the piston 83 is lowered and operates through the mechanism above described to open the clappers. The piston 83 and yoke 74 are returned by a spring 88, permitting the clappers to close. An adjusting screw 89 limits the upward movement of the motor piston and thereby limits the downward movement of the fingers 77. This adjustment permits the clapper sections to be held separated a greater or less distance, as may be required for handling bottles or other articles of different sizes.

The cup conveyor carries the bottles forward and delivers them to an endless belt conveyor 90 running transversely through the leer 92 near its forward end. A shield 93 at the forward end of the cup conveyor prevents the bottles from dropping out of the cups until they have reached a downwardly inclined position about in line with an inclined trough section 94. The shield 93 is pivoted at 100 so that it may swing outwardly under the pressure of the passing bottles. A pusher cam 101 is positioned to engage the neck ends of the bottles as they swing downward and thereby free them from the cups 22 where there is any tendency for the bottles to stick in the cups or to be held by the cups. The bottles thus released will drop freely on the trough 94.

The bottles slide by gravity from the cups down the trough 94 and continue their downward movement through trough sections or chutes 96 and 97 and onto the belt 90. The trough 94 is yieldingly held in its normal position by a spring 98 connected to an arm 102 extending downward from the trough and held by the spring against an adjustable stop 103, so that if any bottle should stick to its cup and fail to slide down the trough, the latter will yield in a downward direction and permit the bottle to pass.

The operation may be summarized as follows:

The bottles or other glass articles are delivered from the forming machine at short intervals in pairs to chutes 46 and dropped neck end first through said chutes and through the spouts 50 into the clappers 52, the lower ends of which are sufficiently restricted to arrest the articles. About the moment the bottles are arrested, air is supplied to the air motor 82 so that its piston descends, rocks the yoke 74 about its pivot 75 and thereby causes the fingers 77 to lift the rods 81 and separate the clapper sections, so that the bottles drop into the cups directly beneath and in register with the clappers. At the same time, the cam 60 on the drive shaft 61 is operating through the lever arm 62 to swing the frame 59 carrying the clappers, so that the latter are advancing with the cups to maintain the clappers in register with the cups during the discharge. The drive shaft 61 as well as the cup conveyor, is driven by or in synchronism with the glass blowing machine, the parts being so proportioned and timed that the clappers will advance at the same speed as the cups and in register therewith. The valve 86 (Fig. 9) which controls the motor for opening the clappers is also operated in synchronism with the blowing machine.

As the bottles are carried forward on the cup conveyor, the blowers 42 blow cooling air on the bottoms of the bottles. The latter then pass through the heated chamber or casing 36, by which undue cooling is prevented. From the cup conveyor the bottles are delivered to the hot belt 90 which carries them into the leer. The mechanism for transferring the bottles from the hot belt onto the leer conveyor is not herein shown, as it forms no part of the present invention.

Various modifications may be resorted to within the spirit and scope of my invention.

What I claim is:—

1. Mechanism for conveying bottles or other glass articles comprising an endless conveyor, rolls mounted to rotate on horizontal axes and over which said conveyor runs, and holders on said conveyor running around said axes and shaped to receive and hold articles in an upright position on the upper lead of the conveyor with the articles projecting upwardly from the conveyor, said holders arranged to discharge the articles as they run over one of said rolls.

2. Mechanism for conveying bottles or other glass articles comprising an endless conveyor, rolls rotating about horizontal axes and over which said conveyor runs, holders on said conveyor shaped to receive and hold articles in an upright position on the conveyor, said holders arranged to discharge the articles as they run over one of said rolls, a second conveyor running transversely to said first mentioned conveyor, and means for directing the discharged articles onto said second conveyor.

3. An endless conveyor comprising parallel sprocket chains, belt sections connecting said chains, and rigid, bottomless holding cups carried on said belt sections, each cup being tapered throughout its length and adapted to receive and discharge vari-sized articles through the same end.

4. In mechanism for transferring glass articles to a leer, the combination of a conveyor, means to support bottles or other articles in upright position, bottom end up, on said conveyor, a blower, and means to drive the conveyor and carry the articles past the blower, the latter being arranged to direct a localized blast of air against said bottoms while the articles are out in the open, and thereby confine the cooling effect of said air mainly to said bottoms.

5. The combination of a conveyor, means to deliver bottles or other articles thereto, means for supporting said articles in upright position, bottom end up, on said conveyor, means to blow cooling air against the bottoms of said articles, a casing or closure through which said articles are carried by the conveyor, and means to supply heat within said closure.

6. The combination of an endless conveyor, laterally spaced rolls mounted to rotate on horizontal axes and over which the conveyor runs, holders on and forming part of the conveyor and in which bottles or other articles are held in upright position, on the upper lead of the conveyor, and an inclined chute in the path of said articles as they are carried downward around a roll, said chute being so positioned that the articles drop by gravity thereon from said holders.

7. The combination of an endless conveyor, rolls over which said conveyor runs, holders on said conveyor in which bottles or other articles are held in upright position, and an inclined chute in the path of said articles as they are carried downward around a roll, said chute being so positioned that the articles drop by gravity thereon from said holders, said chute being mounted to yield in a downward direction and permit an article to pass without being discharged from its holder.

8. In mechanism for transferring bottles or other articles to a leer, the combination of an endless conveyor having upper and lower leads, means for delivering articles thereto in upright position, means for supporting the articles in upright position on the upper lead of the conveyor, a carrying-in belt extending transversely through the leer, and means for transferring the articles from said conveyor onto said belt.

9. In mechanism for transferring bottles or other articles to a leer, the combination of an endless conveyor, means for delivering articles thereto in upright position, means for supporting the articles in upright position on the conveyor, a carrying-in belt extending transversely through the leer, and means for directing articles from said conveyor onto said belt and causing them to be placed in a cumbent position on the belt.

10. The combination of a traveling conveyor, holding devices thereon for holding articles in upright position on the conveyor, a guide over the conveyor arranged to guide the articles to said holding devices while the conveyor is traveling, and driving means to advance said guide with the conveyor while an article is being guided to a holding device and then return the guide.

11. The combination of a traveling conveyor, holding devices thereon for holding articles in upright position on the conveyor, a guide over the conveyor arranged to guide the articles to said holding devices while the conveyor is traveling, driving means to advance said guide with the conveyor while an article is being guided to a holding device and then return the guide, and a safety device comprising a yielding connection between the guide and its driving means.

12. The combination of a traveling conveyor, holders thereon arranged to hold articles in an upright position on the conveyor, a guide over the conveyor arranged to guide articles to said holders as the articles are fed downward to the conveyor, mechanism for driving the conveyor, and mechanism for periodically advancing the guide with the conveyor and then returning the guide.

13. The combination of a traveling conveyor, holders thereon arranged to hold articles in an upright position on the conveyor, a guide over the conveyor arranged to guide articles to said holders as the articles are fed downward to the conveyor, mechanism for driving the conveyor, mechanism for periodically advancing the guide to maintain it in register with a holder during the delivery of an article to the holder, and mechanism for adjusting the conveyor relative to the guide.

14. The combination of an endless conveyor, holders thereon by which articles are held in a predetermined position on the conveyor, a driver for driving the conveyor and carrying said holders past an article receiving position, guides by which articles are guided to the holders, means for delivering articles to the guides at predetermined periods, and mechanism for adjusting the conveyor relative to the driver in the direction of travel of the conveyor.

15. The combination of a traveling conveyor, holders thereon, chutes arranged over said holders through which articles are dropped to the holders while the latter are advancing with the conveyor, and means to oscillate said chutes in synchronism with the advancing movement of the holders and thereby maintain the chutes in register with the holders while articles are being delivered to the holders.

16. The combination of a traveling conveyor, article holders thereon, a non-traveling chute arranged above the conveyor through which articles are delivered to the holder as the latter travel with the conveyor, a retarding device interposed between said chute and holders to temporarily retard articles dropped through the chute, automatic means to actuate the retarding device to release the articles and permit them to drop to the traveling holders, and means whereby the chute is maintained in register with the holders while the articles drop to the holders.

17. The combination of a continuously traveling conveyor, a series of holders thereon, a chute arranged over the conveyor, a pair of clappers between said chute and conveyor, a frame on which said chute and clappers are mounted, automatic mechanism to oscillate said frame and cause the chute and clappers to advance with a holder on the conveyor during the delivery of an article to said holder and to then return and advance with a succeeding holder, and automatic mechanism to operate the clappers for releasing the articles.

18. The combination of a traveling conveyor, article-holding cups thereon, sectional clappers over the conveyor, automatic means to move the clappers back and forth in the direction of travel of the conveyor, and means to move the clapper sections toward and from each other in a direction transverse to said direction of travel of the conveyor.

19. The combination of an endless conveyor, rolls having horizontal axes and over which the conveyor runs, holders on the conveyors and running around said axes in which holders, bottles or other articles are held in upright position on the upper surface of the conveyor, and means for engaging said articles and releasing them from the holders as they are carried downward around a roll.

20. The combination of an endless conveyor, rolls over which the conveyor runs, holders on the conveyors in which bottles or other articles are held in upright position, and a pusher device arranged to engage the inner ends of the articles and release them from the holders.

21. The combination of an endless conveyor, rolls over which the conveyor runs, holders on the conveyors in which bottles or other articles are held in upright position, and a stationary cam in the path of said articles as they are carried downward around a roll, said cam positioned to engage the inner ends of the articles and release them from the holders.

Signed at Toledo, in the county of Lucas and State of Ohio, this 8th day of May, 1923.

MICHAEL J. OWENS.